United States Patent [19]
Lunde et al.

[11] Patent Number: 6,055,790
[45] Date of Patent: May 2, 2000

[54] THERMAL CONDUCTIVE INSERT FOR SANDWICH STRUCTURES

[75] Inventors: Steven M. Lunde, Auburn; Paul D. Nedervelt, Seattle, both of Wash.

[73] Assignee: The United States of America as represented by the Secretary of the Air Force, Washington, D.C.

[21] Appl. No.: 09/081,714

[22] Filed: May 18, 1998

[51] Int. Cl.[7] .................................................. E04C 2/54
[52] U.S. Cl. ...................................... 52/787.1; 52/787.12
[58] Field of Search .............................. 52/787.1, 787.12

[56] References Cited

U.S. PATENT DOCUMENTS

| | | | |
|---|---|---|---|
| 3,137,887 | 6/1964 | Manning et al. | 16/2 |
| 3,252,493 | 5/1966 | Smith | 151/41.7 |
| 3,526,072 | 9/1970 | Campbell | 52/617 |
| 4,481,702 | 11/1984 | Mitchell . | |
| 4,557,100 | 12/1985 | Gorges . | |

Primary Examiner—Christopher T. Kent
Assistant Examiner—Nkeisha J. Maddox
Attorney, Agent, or Firm—Thomas C. Stover

[57] ABSTRACT

In a sandwich structure having a honeycomb core between a pair of composite face sheets, an insert is provided that passes through such structure. The insert terminates in an opening, flush or below the top face sheet and has a flange which overlaps and contacts the face sheet from below. Such opening can receive attaching hardware and a fastener which clamps the attaching hardware against the face sheet and the flange below, for good thermal conductivity between attaching hardware and the face sheet and thus the core and the bottom face sheet of the sandwich structure. This permits a heat source mounted, e.g., in a spacecraft, to a sandwich wall by attaching hardware, to more readily discharge excess heat through such wall and to an exterior face sheet for improved heat conduction and radiation therefrom.

12 Claims, 2 Drawing Sheets

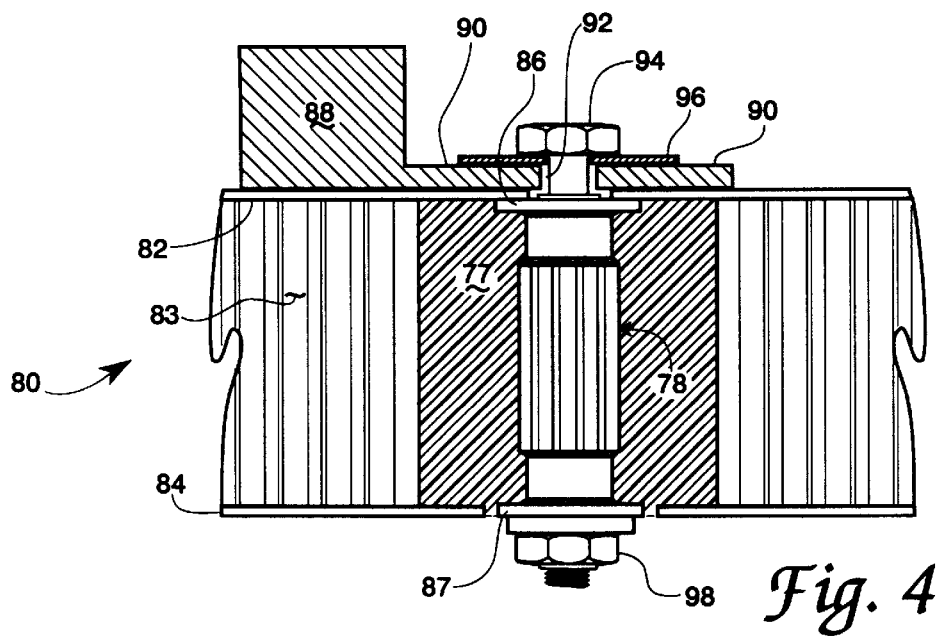
Fig. 4
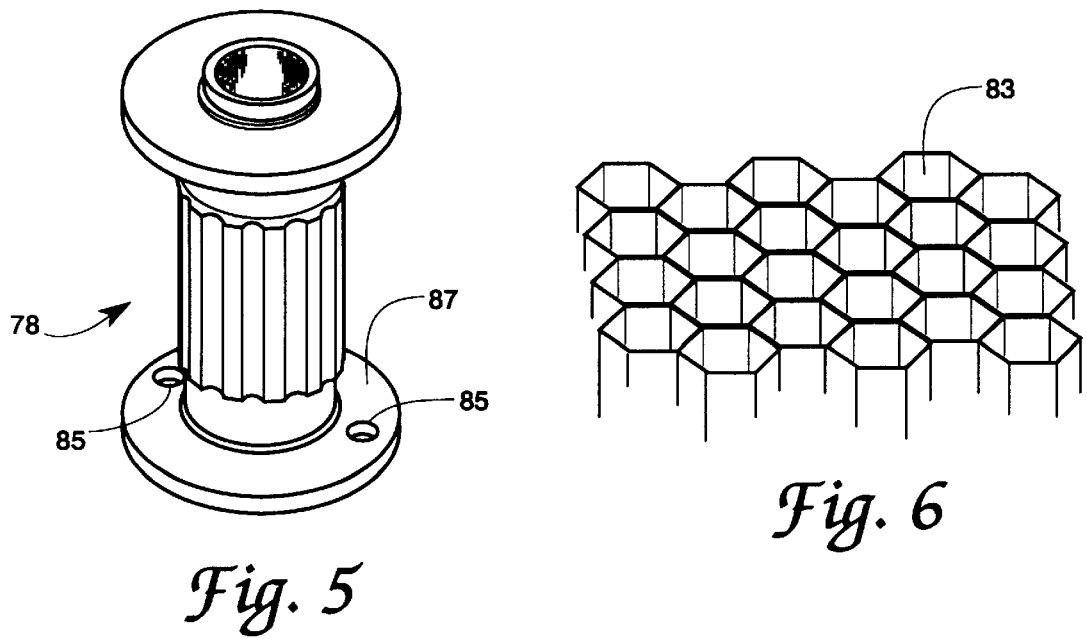
Fig. 5
Fig. 6

THERMAL CONDUCTIVE INSERT FOR SANDWICH STRUCTURES

CROSS-REFERENCES TO RELATED PATENT APPLICATIONS

Not Applicable

STATEMENT REGARDING FEDERALLY SPONSORED RESEARCH OR DEVELOPMENT

The invention described herein may be manufactured and used by or for the Government for governmental purposes without the payment of any royalty thereon.

BACKGROUND OF THE INVENTION

1. Field of the Invention

The present invention relates to inserts in sandwich structures, particularly inserts which enhance thermal conductivity thereof

2. Description of Related Art

Sandwich construction with composite (graphite resin) face sheets and aluminum or titanium honeycomb have been used to provide high stiffness and low weight structures. Attaching hardware (electrical boxes or other structures) to the sandwich often requires high thermal conductivity between the composite face sheets and attaching hardware. This is especially true in situations where there is no convection, such as spacecraft applications. Inserts are often installed in the sandwich to allow mechanical fasteners (bolts or screws) to be used to hold the hardware to the sandwich. However, typical inserts do not provide the thermal conductivity needed between the composite face sheets and the attaching hardware.

Vendors currently supply a variety of insert sizes and designs (eg., per FIG. 1) but none have been found to meet the thermal conductivity needs of composite sandwich structures. Tests have shown thermal conductance values of about 0.1 W/°C. to be typical with desired values more in the range of 0.5 W/°C.

That is, in spacecraft, motors or other heat generating units are mounted to the walls thereof and need to discharge their heat through such walls and into space to avoid overheating. These units are mounted to the walls by fasteners secured by inserts, eg., as indicated in FIG. 1. Typically, however, the heat generating unit's attaching hardware is not held in sufficient contact with the face sheet(s) of the structure to allow heat to be readily conducted therefrom through the sandwich wall structure as more fully described below with respect to FIG. 1.

Related patents noted herein relative to inserts in spacecraft are U.S. Pat. No. 5,263,538 to M. Amidieu et al (1993), U.S. Pat. No. 5,474,262 to J. Fiore (1995) and U.S. Pat. No. 5,624,088 to J. Fiore (1997). While these references disclose sandwich walls for spacecraft and inserts therefor, no disclosure of employing inserts to enhance thermal conductivity from attaching hardware through a sandwich structure is seen.

Accordingly, there is need and market for thermal conductivity (TC) inserts for sandwich structures that overcomes the above prior art shortcomings.

There has now been discovered a TC insert that serves to increase the contact area between a sandwich face sheet and attaching hardware (AH) so as to provide elevated thermal conductive values therebetween.

BRIEF SUMMARY OF THE INVENTION

Broadly the present invention provides, in a sandwich structure having at least one thermoconductive(TC) face sheet mounted to a core, a mounting means including, a) an insert imbedded into the structure proximate the face sheet, the insert terminating in an opening and b) a flange mounted on the insert proximate the opening, which flange overlaps and contacts the face sheet from below, which opening can receive attaching hardware (AH) and a fastener which clamps the AH against the face sheet and the flange in close contact therewith, for good thermal conductivity between the AH and the face sheet.

BRIEF DESCRIPTION OF THE DRAWINGS

The invention will become more apparent from the following detailed specification and drawings in which;

FIG. 4 is a schematic sectional elevation view of another TC insert embodying the present invention installed a sandwich structure;

FIG. 5 is a perspective view of the TC insert of FIG. 4 and

FIG. 6 is a schematic fragmentary perspective view of part of the core of the structure of FIG. 4.

DETAILED DESCRIPTION OF THE INVENTION

Figure 1:
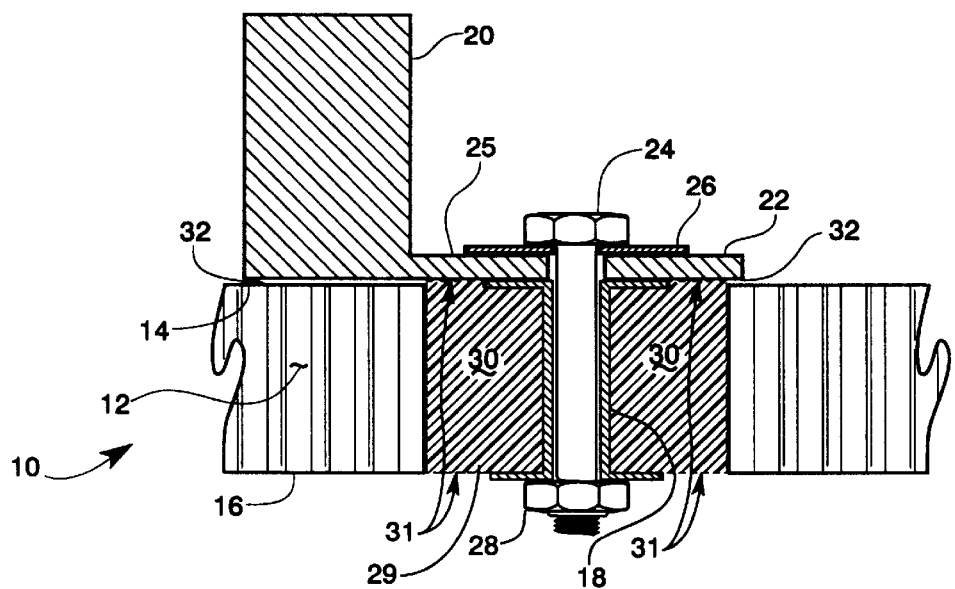
FIG. 1 is a schematic elevation view, partly in section, of a sandwich structure having an insert per the prior art.

Referring in more detail to the drawings, an insert for a sandwich structure of the prior art is shown in FIG. 1. Thus sandwich panel 10 has honeycomb core 12 and face sheets 14 & 16 with insert 18 passing therethrough as shown in FIG. 1.

A heat source, e.g., a motor 20, having attaching hardware (AH) 22, is held to the sandwich panel by bolt 24, washer 26 and nut 28 as shown FIG. 1. The insert 18 is secured in the panel cavity 29 by adhesive 30 which however can flow up above the face sheet (FS) 14, which can interfere with contact between it and the (AH) 22. But even if the adhesive does not rise above the FS 14, the best contact between attaching hardware and face sheet is in the clamping area between the washer 26 and the insert's upper flange 25 and here there is no TC face sheet and honeycomb (below the AH), just non conducting adhesive 30, as shown in FIG. 1. Outside the clamping area there is less clamping pressure and less close contact as indicated by gap 32 in FIG. 1. Hence thermal conduction from the heat source 20 to the outside FS 16 is greatly limited.

Thus if the heat source 20 is inside a spacecraft, there can be insufficient contact between its AH 22 and the FS 14 to conduct heat therefrom through the honeycomb core 12, usually of metal, to the outer FS 16 on the outside of the spacecraft to radiate same into space and excessive heat build-up (and burn out of the heat source) can occur inside the spacecraft.

Figure 2:
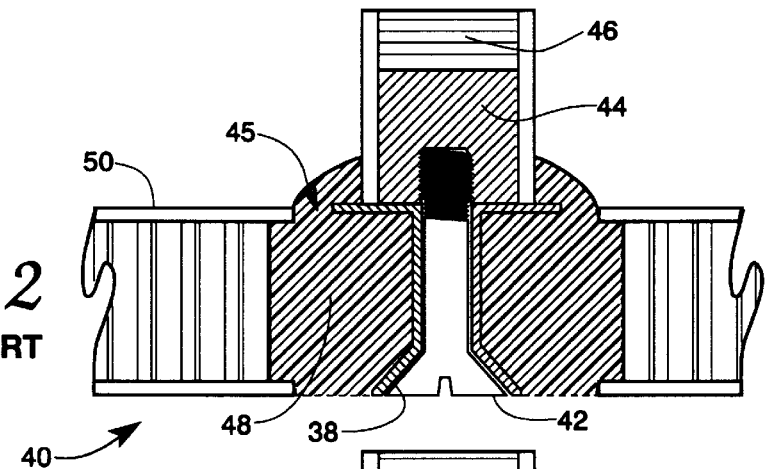
FIG. 2 is a schematic sectional elevation view of another insert of the prior art.

Another typical insert of the prior art is shown in FIG. 2 wherein sandwich structure 40 has insert 38 and screw 42 to hold AH 44 and heat source 46 thereto. The insert 38 is held in place by adhesive 48, by which (and by gap 45) transfer of heat is blocked from the AH 44 to FS 50 of the panel 40 with overheating of the heat source 46 likely.

Figure 3:
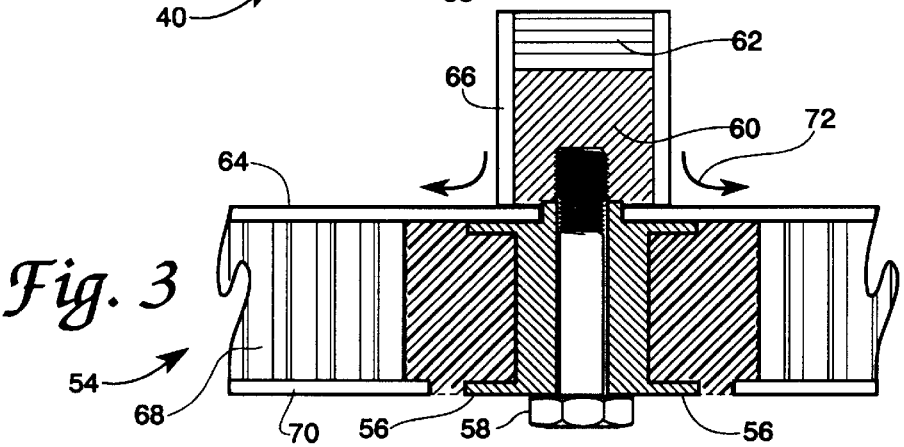
FIG. 3 is a schematic sectional elevation view of a TC insert per the present invention.

However, in a sandwich structure 54, embodying the invention, such structure has insert 56 to receive bolt 58 to hold AH 60 and heat source 62 in close contact with FS 64 as shown in FIG. 3. Accordingly, heat from the heat source 62 can travel down, eg., wall 66 directly to the AH 60, thence directly to FS 64 and down through aluminum honeycomb 68 to lower or outside FS 70, to radiate heat therefrom as indicated in FIG. 3. Likewise, a similar heat transfer path occurs on the other side of fastener 58, as indicated in part, by arrow 72 of FIG. 3.

Turning to FIG. 4, and comparing same to the structure of FIG. 1, one can see how the above TC problem is solved. That is, insert 78 is mounted in sandwich structure 80 which has top FS 82 and bottom FS 84 connected by TC honeycomb 83, as shown FIGS. 4 & 6.

Now the insert 78, shown in FIGS. 4 & 5, is inserted into cavity 77 of the sandwich structure 80 from below per FIG. 4 and pushed in until its upper flange 86 contacts the lower surfaces of the upper FS 82. Thus such flange 86 overlaps and contacts FS 82 from below permitting strong clamping of AH and FS together as discussed below The insert 78 is fixed in place in such cavity 77 by injecting adhesive (which later solidifies) through holes 85 in the bottom flange 87, as shown or indicated in FIGS. 4 and 5. Also the upper flange 86 of the insert 78 can block adhesive from flowing to the upper surfaces of FS 82, which can impair thermal contact between AH and FS, as noted above and as indicated in FIG. 4.

Now adjacent FS 82 is mounted to heat source 88 and AH 90, having a bolt hole 92 for receiving bolt 94 as it passes through washer 96, such bolt hole 92 and into the insert 78 and through nut 98. The nut 98 is turned to tightly clamp the bolt 94 and tile AH 90 hard against the FS 82 and the underlying upper flange 86, for good thermal contact therebetween and without deforming the FS 82, as indicated in FIG. 4. That is, the best thermal contact area of the AH & FS per the invention, is seen as the clamping area between the washer 96 and the upper flange 86, as shown in FIG. 4.

Thus the assembly of the invention, e.g., per FIG. 4, provides improved TC values between AH and FS. Test data has demonstrated conductance values therebetween of >0.4 W/°C. as compared with values of about 0.1 W/°C. typical of prior art inserts in sandwich structures.

Accordingly the flanged insert and its fastener, per the invention, provide an AH-FS clamping assembly for good thermal conduction of a heat source through the AH and inside FS and through the sandwich structure to its outside FS, for radiation and effective cooling of such heat source.

We claim:

1. In a sandwich structure having at least one thermoconductive(TC) face sheet mounted to a core, a mounting means comprising, a) an insert imbedded into said structure proximate said face sheet, said insert terminating in an opening and b) a flange mounted on said insert proximate said opening, which flange overlaps and contacts said face sheet from below, which opening can receive attaching hardware (AH) and a fastener which clamps said AH against said face sheet and said flange in close contact therewith, without deforming said structure for good thermal conductivity between said AH and said face sheet.

2. The sandwich structure of claim 1 having a TC honeycomb core.

3. The sandwich structure of claim 2 having a TC honeycomb core of metal.

4. The sandwich structure of claim 3 wherein said metal is aluminum.

5. The sandwich structure of claim 1 wherein said insert is mounted in said core in a cavity having adhesive therein and said flange blocks said adhesive from flowing to an upper surface of said face sheet (FS).

6. The sandwich structure of claim 1 wherein said core includes a TC honeycomb mounted between a pair of composite face sheets and said insert passes through said core.

7. The sandwich structure of claim 1 wherein said fastener is a bolt or a screw.

8. The sandwich structure of claim 1 wherein said flange and said fastener form an AH-FS clamping assembly.

9. An insert for mounting in a sandwich structure having at least one thermal conductive (TC) face sheet mounted to a core comprising a hollow member terminating in a flange proximate at least one end thereof to receive a fastening member therein for clamping attaching hardware (AH) against said face sheet and said flange in TC therewith without deforming said structure.

10. The insert of claim 9 mounted to said sandwich structure, which receives a fastening member over an AH in contact with an inside face sheet which is in TC contact with a honeycomb core in turn in TC contact with an outside face sheet to define said sandwich structure, for conducting heat from said AH through said sandwich structure from within to outside thereof.

11. A method for conducting heat through a sandwich panel having an inner thermal conductive (TC) face sheet (FS), an outer FS and a TC core therebetween comprising, clamping an attaching member (AH) to a hollow insert mounted through said panel against said inner FS without deforming said panel for conducting heat from the AH through the inner FS and its core to the outer FS.

12. The method of claim 11 wherein said insert has a flange thereon which is proximate an inner surface of an FS of said panel, which insert receives said AH thereon and a fastening means through an opening in said AH and into said insert so as to clamp said AH to said FS and said flange in good TC contact therewith.

* * * * *